(12) United States Patent
Glier

(10) Patent No.: US 7,726,234 B2
(45) Date of Patent: Jun. 1, 2010

(54) COOKING APPARATUS

(76) Inventor: Daniel William Glier, P.O. Box 1052, Covington, KY (US) 41012-1052

( * ) Notice: Subject to any disclaimer, the term of this patent is extended or adjusted under 35 U.S.C. 154(b) by 990 days.

(21) Appl. No.: 11/181,328

(22) Filed: Jul. 14, 2005

(65) Prior Publication Data

US 2007/0012198 A1    Jan. 18, 2007

(51) Int. Cl.
    *A47J 39/00*    (2006.01)
(52) U.S. Cl. .............................. 99/348; 99/403; 99/407
(58) Field of Classification Search ........................ None
    See application file for complete search history.

(56) References Cited

U.S. PATENT DOCUMENTS

| | | | |
|---|---|---|---|
| 230,274 A | 7/1880 | Haskell | |
| 377,712 A | 2/1888 | Eymer | |
| 519,950 A | 5/1894 | Hastings | |
| 575,418 A | 1/1897 | Deal | |
| 734,054 A | 7/1903 | Frost | |
| 1,334,930 A | 3/1920 | Chadwick | |
| 2,725,460 A * | 11/1955 | Braski et al. | 219/436 |
| 2,969,452 A * | 1/1961 | Geller et al. | 219/436 |
| 3,432,642 A * | 3/1969 | Lohr et al. | 219/439 |
| 3,769,899 A | 11/1973 | Kostko | |
| 3,806,701 A * | 4/1974 | Scott | 219/438 |
| 3,945,534 A | 3/1976 | Ady | |
| 4,039,777 A * | 8/1977 | Baker | 219/439 |
| 4,798,939 A * | 1/1989 | Nett | 219/438 |
| 5,033,453 A | 7/1991 | Loyd et al. | |
| 5,355,777 A * | 10/1994 | Chen et al. | 99/340 |
| 5,381,729 A * | 1/1995 | Hennessy et al. | 99/483 |
| 5,539,185 A * | 7/1996 | Polster | 219/439 |
| 5,567,458 A | 10/1996 | Wu | |
| 5,632,403 A | 5/1997 | Deng | |
| 5,794,522 A * | 8/1998 | Bois et al. | 99/330 |
| 5,865,098 A * | 2/1999 | Anelli | 99/331 |
| 6,076,451 A | 6/2000 | Studer | |
| 6,100,504 A * | 8/2000 | Wagner | 219/432 |
| 6,103,291 A | 8/2000 | Tapia | |
| 7,141,764 B1 * | 11/2006 | Shumate | 219/430 |
| 7,167,642 B1 * | 1/2007 | Wagner | 392/441 |
| 7,312,425 B2 * | 12/2007 | DeCobert et al. | 219/433 |
| 7,412,922 B2 * | 8/2008 | McLemore | 99/413 |
| 2006/0272517 A1 * | 12/2006 | Groll | 99/483 |

* cited by examiner

*Primary Examiner*—Thor S Campbell
(74) *Attorney, Agent, or Firm*—Frost Brown Todd LLC

(57) ABSTRACT

A cooking apparatus comprises a trough, a well, and a pot. The trough is configured to hold a first cooking medium. The trough has insulated floors, insulated walls, and a steam pipe as a heating element to directly heat the first cooking medium. The well is joined to a cover plate. The cover plate is configured to fit over the trough with a seal, such that at least a portion of the well extends into the trough for submersion into the first cooking medium. The pot is inserted in the well. A second cooking medium may be introduced in the well adjacent to the pot. A food product such as goetta may be introduced to the pot for cooking. Heat may be transferred from the heating element, to the first cooking medium, to the well, to the second cooking medium, to the pot, and then to the goetta.

19 Claims, 3 Drawing Sheets

COOKING APPARATUS

BACKGROUND OF THE INVENTION

Goetta, a German dish, is often compared to breakfast sausage or scrapple. It is often a mixture of pork, beef, steel-cut or pinhead oats, and seasonings. This product is often packaged in one pound rolls or is fresh cut at a grocery or restaurant from larger blocks. Many people enjoy goetta at breakfast as a side dish with eggs or pancakes.

The term "goetta" may be derived from the German word "götte." The food originates from the Oldenburg, Hanover, and Westphalia areas of Germany. Large numbers of German settlers who came from Northwest Germany settled in places like Cincinnati, OH, including neighboring Northern Kentucky, bringing goetta and other traditional German foods to the area.

As with other foods, the preparation of goetta may include cooking the goetta prior to packaging it. Many conventional cooking devices may tend to adversely affect the working conditions for those using such devices. For instance, some conventional cooking devices may generate an undesirable amount of heat and/or steam. Some conventional cooking devices-may also require repeated addition of water, or burdensome efforts to clean. Some conventional cooking devices may also provide unsatisfactory energy efficiency.

BRIEF SUMMARY OF THE INVENTION

A device for cooking food product comprises a trough. The trough comprises an insulated outer wall. The device further comprises a top member sealed to the upper edges of the outer wall. The top member comprises a well extending into the trough. The device further comprises a heating element contained within the trough. The device further comprises a stock pot configured to fit inside the well. The device further comprises thermal oil contained between the outer wall of the trough and the well.

In another embodiment, a cooking device comprises a trough. The trough comprises a plurality of sidewalls and a floor joining at least a first portion of the plurality of sidewalls. The trough further comprises a lip. The lip and at least a second portion of the plurality of sidewalls define a top opening of the trough. The trough further comprises a heating element positioned adjacent the floor of the trough. The trough further comprises a cooking medium in thermal communication with the heating element. The cooking medium has a boiling point that is higher than the boiling point of water. The cooking device further comprises a cover plate. The cover plate is configured to fit on the lip of the trough, and to cover the top opening of the trough. The cooking device further comprises a well extending downwardly from the cover plate. At least a portion of the well is in thermal communication with the cooking medium.

In yet another embodiment, a method of cooking a food product comprises providing a cooking device. The cooking device comprises a trough containing a heating element. The cooking device further comprises a cover plate sealed to the trough, and a well extending through the cover plate into the trough. The method further comprises introducing a cooking medium into the trough. The cooking medium is configured to transfer heat from the heating element to the well. The method further comprises heating the cooking medium with the heating element. The method further comprises introducing a food product into the well to heat the food product.

More embodiments will be described below. Other embodiments will be apparent to those of ordinary skill in the art.

BRIEF DESCRIPTION OF THE DRAWINGS

While the specification concludes with claims that particularly point out and distinctly claim the invention, it is believed the present invention will be better understood from the following description taken in conjunction with the accompanying drawings, in which like reference numerals identify the same elements. The drawings and detailed description which follow are intended to be merely illustrative and are not intended to limit the scope of the invention as set forth in the appended claims.

DETAILED DESCRIPTION OF EMBODIMENTS OF THE INVENTION

The following description should not be used to limit the scope of the present invention. Other examples, features, aspects, embodiments, and advantages of the invention will become apparent to those skilled in the art from the following description, which includes by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive. It should therefore be understood that the inventor contemplates a variety of embodiments that are not explicitly disclosed herein.

Figure 1:
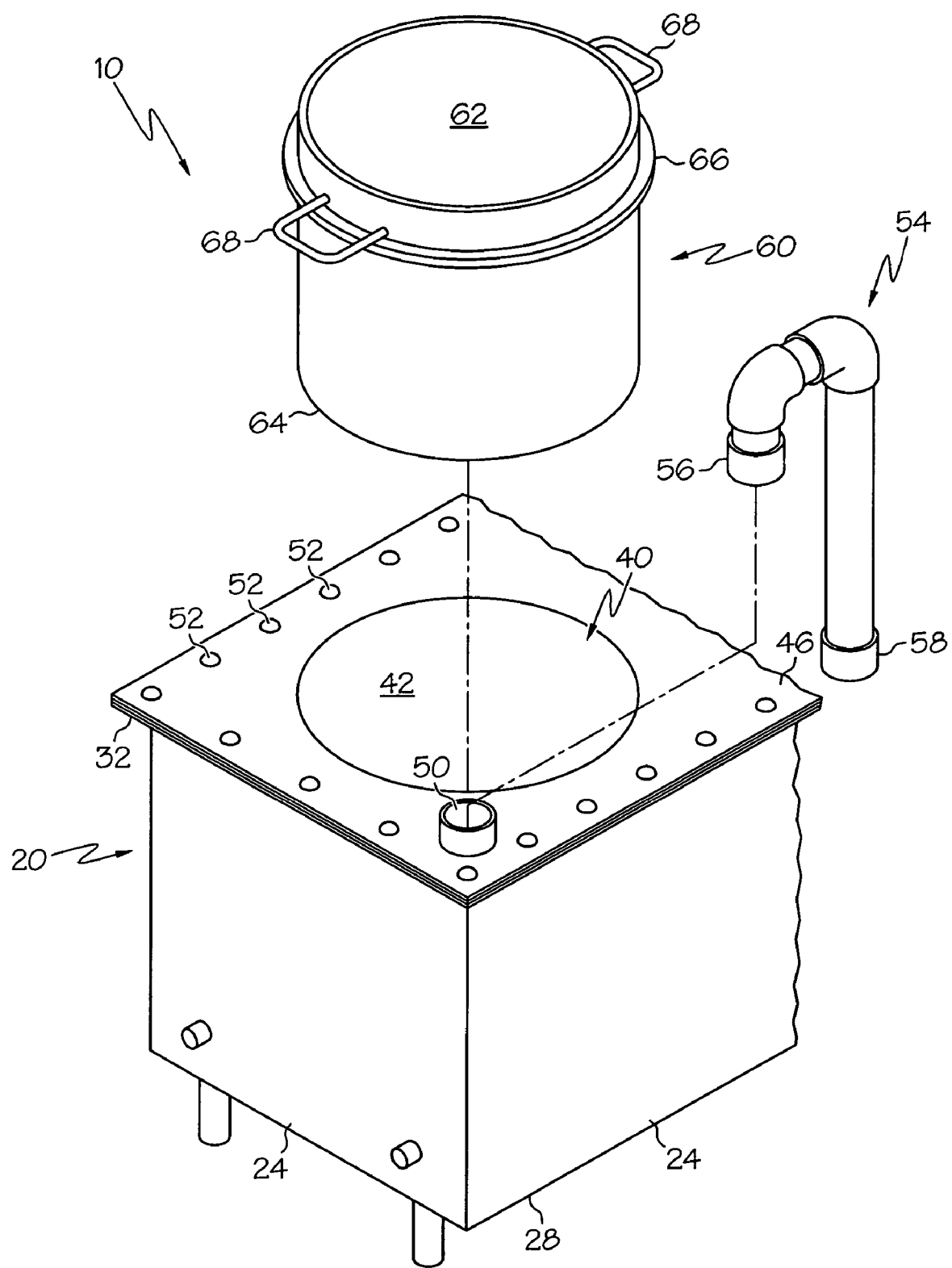
FIG. 1 depicts a perspective view of a cooking device.
Figure 2:
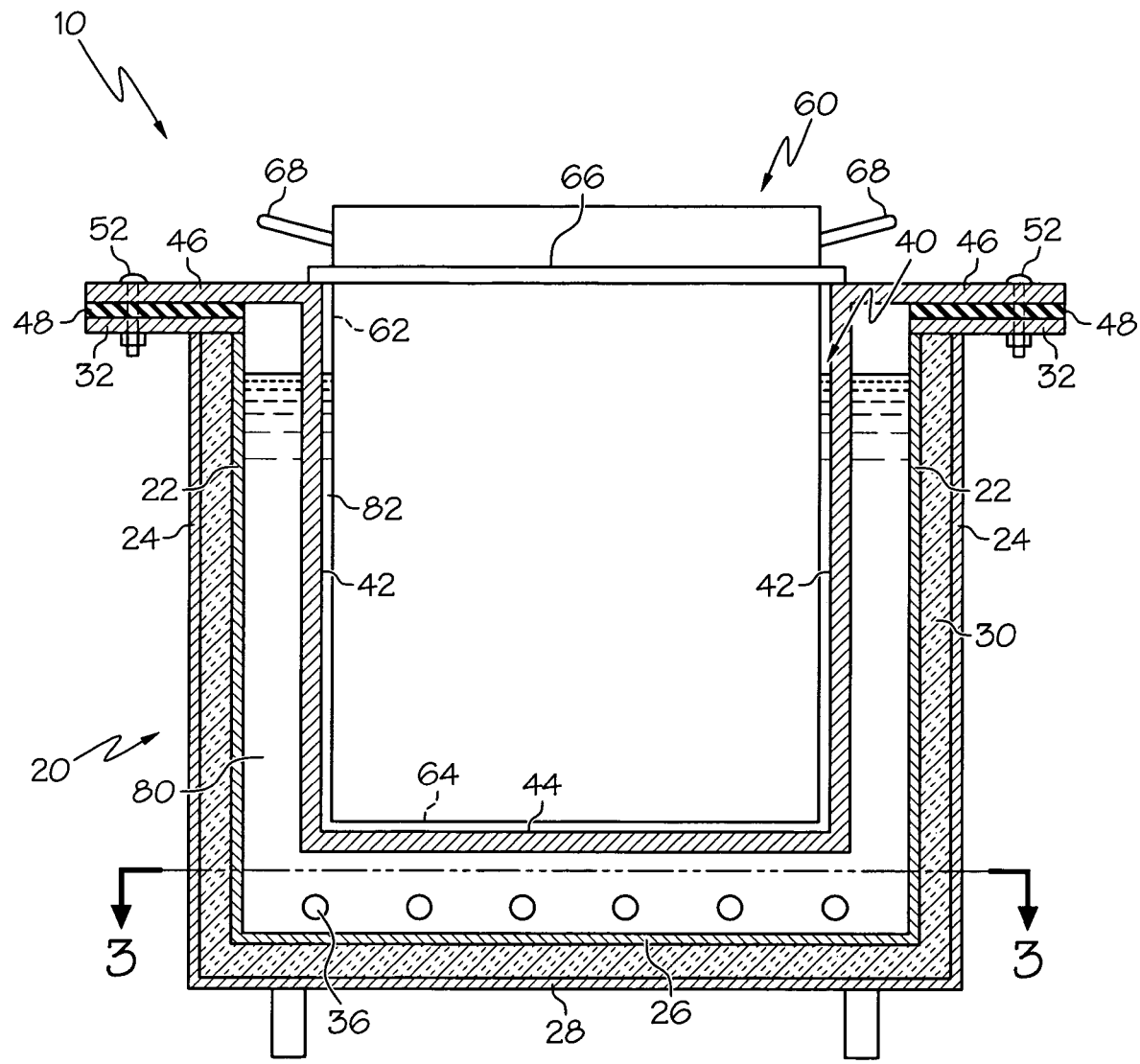
FIG. 2 depicts a cross-sectional view of the cooking device of FIG. 1.
Figure 3:
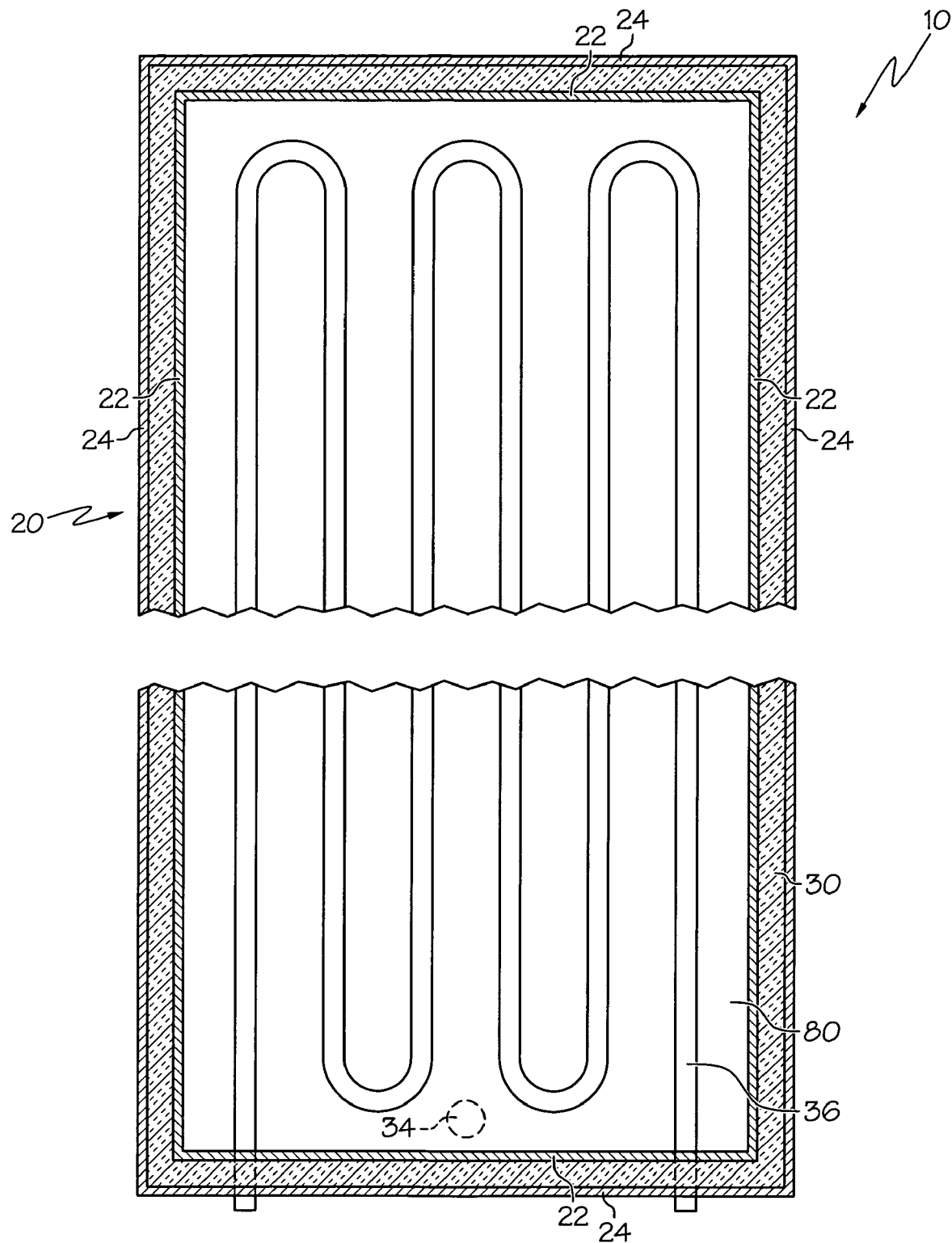
FIG. 3 depicts a cross-sectional view of the cooking device of FIG. 1.

FIG. 1 depicts a cooker 10, in which a food product may be cooked. For instance, cooker 10 may be used to cook goetta. Alternatively, cooker 10 may be used to cook any other food product, including but not limited to scrapple (a food product similar to goetta, but with cornmeal instead of oats), grutz or grutze (a food product similar to goetta, but with barley instead of oats), soups and the like, or any other food. A variety of foods which may be prepared, at least in part, in cooker 10 will be apparent to those of ordinary skill in the art.

The cooker 10 of the present example comprises a trough 20, a well 40, and a pot 60. The trough 20 comprises four inner sidewalls 22 and four outer sidewalls 24. Inner sidewalls 22 are joined by a floor 26, and outer sidewalls 24 are joined by a floor 28. Insulation 30 is provided between sidewalls 22, 24 and floors 26, 28. A lip 32 joins the upper edges of sidewalls 22, 24, and extends outwardly beyond outer sidewalls 24 about the perimeter of trough 20. While trough 20 is shown as having a generally rectangular shape, it will be appreciated that any other suitable shape may be used.

Trough 20 is configured to hold a thermal oil 80 as a cooking medium.

In this embodiment, the thermal oil 80 is food grade and non-toxic, and will not render food unsuitable for eating if the food is exposed to the oil. Alternatively, any other cooking medium may be used, including but not limited to other oils, water, air, or any other medium.

Preferably, the cooking medium has the ability to transfer heat efficiently. For instance, thermal oil 80 of the present example has a tendency to heat uniformly (i.e., the temperature of the oil 80 is uniform). Thermal oil 80 of the present example also has a boiling point that is higher than the boiling point of water. Other cooking media having a boiling point that is higher than the boiling point of water will be apparent to those of ordinary skill in the art.

In the present example, a drain 34, which may be plugged during use of cooker 10, is provided in floors 26, 28 of trough 20 for draining the oil 80 therethrough. Of course, drain 34 is optional, and may be omitted or substituted. It will also be appreciated that oil 80 may be introduced into cooker 10 via drain 34 in addition to or as an alternative to being introduced via port 50.

In the present example, trough 20 is formed of stainless steel. Inner sidewalls 22 are welded to floor 26, and outer sidewalls 24 are welded to floor 28. Lip 32 is welded to the upper edges of sidewalls 22, 24.

Of course, any other materials or process for forming may be used for trough 20. By way of example only, any component of trough 20 may be pressed or molded, or may be joined with another component by one or more fasteners or the like. Other suitable configurations, materials, and processes for making trough 20 will be apparent to those of ordinary skill in the art.

Insulation 30 of the present example comprises a fiberglass board material having a thickness of approximately one inch. The board is inserted between sidewalls 22, 24 and floors 26, 28 before welding takes place. Of course, any other process may be employed for inserting insulation 30 in the appropriate space, and any other material may be used for insulation 30. For instance, sulfur-based expandable glass, polyurethane, polystyrene, or any other material or combination of materials may be used. Suitable insulation 30 materials, sizes, and features will be apparent to those of ordinary skill in the art.

Alternatively, insulation 30 may be omitted. Accordingly, trough 20 may be constructed such that inner sidewalls 22 and floor 26 (or outer sidewalls 24 and floor 28) are omitted. Of course, inner sidewalls 22 and floor 26 (or outer sidewalls 24 and floor 28) may also be omitted without omitting insulation 30, which may be positioned on either side of the remaining sidewall 24 (or 22) and floor 28 (or 26) or elsewhere.

It will also be appreciated that insulation 30 may be provided in only a portion of the space between sidewalls 24, 28 or the space between floors 26, 28. Alternatively, any other variation or configuration for insulation 30 may be used.

A heating element 36 is located in the bottom of trough 20, near floor 26. In the present example, heating element 36 comprises a six pass steam pipe running longitudinally along floor 26 of trough 20.

Alternatively, where a steam pipe or similar device is used, the steam pipe may make any number of passes in trough 20, or have any other configuration. For instance, a heating element 36 may run along one or more sidewalls 22, run between sidewalls 22, 24, be positioned outside sidewall 24, run along a cover plate 46, or have any other positioning. As shown, heating element 36 enters and leaves trough 20 through the same sidewalls 22, 24. Of course, heating element 36 may enter and/or leave trough 20 at any other location(s). For instance, a steam pipe may enter and/or leave through any one or more sidewalls 22, 24, the floors 26, 28, and/or a cover plate 46, including combinations thereof.

Heating element 36 of the present example is configured to heat the oil 80 being held in trough 20. Heating element 36 may be modified in a variety of ways. For instance, heating element 36 may comprise thermal oil pipes instead of steam pipes. By way of example only, an external thermal oil heater may be used to heat thermal oil, which may then be circulated through cooker 10 via a heating element 36 or other device. Alternatively, heating element 36 may comprise an electrical heating element. Of course, heating element 36 may be eliminated, and heat may be provided in any other way. For instance, a burner or other device may be provided within trough 20, underneath trough 20, or elsewhere. In another embodiment, an external thermal oil heater is used without a heating element 36. Still other devices, configurations, and techniques for providing heat for cooker 10 will be apparent to those of ordinary skill in the art.

Each well 40 of the present example comprises a sidewall 42 and a floor 44. The upper edge of sidewall 42 is welded to a cover plate 46.

In an alternate embodiment, wells 40 and cover plate 46 are not integral. In the present example, cover plate 46 is dimensioned to fit over lip 32 of trough 20. A gasket 48 is provided between cover plate 46 and lip 32. Gasket 48 may prevent the escape of heat and/or oil 80 from trough 20, or may serve other purposes. In the present example, gasket 48 comprises a buna material. It will be appreciated that buna material may provide an appreciable resistance to degradation when exposed to oils or other liquids, materials, or gases. Alternatively, any other material may be used for gasket 48, including but not limited to any type of rubber, cork, TEFLON®, or any other material. Of course, gasket 48 may be eliminated.

In the present example, cover plate 46 includes a port 50 for the introduction of oil 80 into trough 20. Alternatively, port 50 may be positioned at any other suitable location on cooker 10. It will also be appreciated that oil 80 may be removed via port 50, such as by use of a vacuum pump by way of example only.

In the present example, a vent assembly 54 is coupled with port 50.

The vent assembly 54 is generally "U"-shaped, and has a port end 56 configured to selectively engage with port 50. The vent assembly 54 also has a capped end 58 including a plurality of holes configured to permit the passage of air therethrough. Vent assembly 54 is configured to provide pressure equalization during expansion and contraction of oil 80 caused by temperature change and the like. Of course, vent assembly 54 is optional. It will also be appreciated that vent assembly 54 may be configured in any other suitable fashion.

In yet another embodiment, port 50 is omitted, and oil 80 is introduced into trough 20 upon removal of cover plate 46. Still other features, devices, and techniques for introducing and/or removing oil 80 will be apparent to those of ordinary skill in the art.

Cover plate 46 is secured to lip 32 with a plurality of bolts 52.

Alternatively, any other fastener may be used. In another embodiment, cover plate 46 is in a hinged relationship with lip 32. In yet another embodiment, cover plate 46 is secured to lip 32 by one or more clamps. In still another embodiment, cover plate 46 rests on lip 32 and is not held by any type of fastener. Still other configurations and relationships between cover plate 46 and trough 20 will be apparent to those of ordinary skill in the art.

Pot 60 of the present example comprises an aluminum stock pot.

Alternatively, any other material(s) may be used for pot 60, including but not limited to stainless steel. Pot 60 is configured to hold a food, such as goetta by way of example only. Pot 60 has a sidewall 62 and a floor 64. An annular lip 66 is positioned on the outer perimeter of sidewall 62. Pot 60 further comprises a pair of handles 68. Pot 60 is dimensioned to fit in well 40. In the present example, the relative configuration of pot 60 and well 40 is such that pot 60 may be inserted and withdrawn from well 40 with relative ease. Annular lip 66 of pot 60 has a radius that is greater than the radius of sidewall 42 of well 40. Accordingly, in the present example, pot 60 rests on annular lip 66 when pot 60 is positioned within well 40. However, it will be appreciated that pot 60 and well 40 may be configured to fit in any other way, and that pot 60 may be provided with a variety of alternative components and configurations.

A second cooking medium, such as water 82 by way of example only, may be provided between pot 60 and well 40. Instead of water 82, it will be appreciated that any liquid such as thermal oil or any other cooking medium may be introduced to facilitate heat transfer from sidewall 42 and floor 44 of well 40 to sidewall 62 and floor 64 of pot 60. Of course, any cooking medium may be used, or none at all.

It will be appreciated that a cooker 10 may comprise any suitable number of wells 40 and/or pots 60. In one embodiment, a cooker 10 comprises four wells 40 and four pots 60. It will also be appreciated that pots 60 may be eliminated, and that food may be cooked directly in wells 40. Accordingly, as used herein, a phrase such as "in the well" and variations thereof should be read as including situations where food is in pot 60 inserted in well 40, as well as situations where pot 60 is omitted and food is cooked directly in well 40. Other pot 60 alternatives will be apparent to those of ordinary skill in the art, including but not limited to racks, baskets, and other devices. In yet another embodiment, wells 40 are eliminated, and the cover plate 46 simply has an opening configured to receive a pot 60. Still other variations of wells 40 and/or cover plate 46 will be apparent to those of ordinary skill in the art.

In one embodiment, a lid is placed over pot 60 during cooking. Of course, a lid is optional.

In an exemplary use of cooker 10, thermal oil 80 is introduced into trough 20 via port 50. Steam is provided through heating element 36 to heat oil 80. A small amount of water 82 is introduced into well 40.

Pot 60 is then inserted into well 40. Approximately 180 lbs. of goetta is then introduced into pot 60. The elevational level of the goetta in pot 60 corresponds approximately to the elevational level of oil 80 in trough 20. The temperature of oil 80 is varied by the pressure of the steam in heating element 36, until the temperature inside pot 60 reaches approximately 185° F. The combination of the heating element 36 and oil 80 results in the uniform application of heat to the goetta (i.e. the same amount of heat is applied to goetta in the top of pot 60 as is applied to goetta in the bottom of pot 60). In the present example, the pressure of the steam is maintained at approximately 12 lbs. The goetta is cooked for approximately 4 to 4.5 hours, and is stirred occasionally. The goetta is then packaged and shipped for sale.

Of course, cooker 10 is subject to a variety of alternative uses. By way of example only, any other cooking temperature and/or cooking time may be used. In addition, where cooker 10 includes a heating element 36 comprising a pressurized medium such as steam, the pressure of the pressurized medium may be at any suitable level. Still other variations of use will be apparent to those of ordinary skill in the art.

Having shown and described various embodiments and concepts of the invention, further adaptations of the methods and systems described herein can be accomplished by appropriate modifications by one of ordinary skill in the art without departing from the scope of the invention. Several of such potential alternatives, modifications, and variations have been mentioned, and others will be apparent to those skilled in the art in light of the foregoing teachings. Accordingly, the invention is intended to embrace all such alternatives, modifications and variations as may fall within the spirit and scope of the appended claims and is understood not to be limited to the details of structure and operation shown and described in the specification and drawings.

What is claimed is:

1. A device for cooking food products comprising:
   (a) a trough, wherein the trough comprises
      (i) a plurality of insulated walls, wherein each of the insulated walls has a top portion and a bottom portion,
      (ii) a floor joining the bottom portions of the insulated walls of the trough, and
      (iii) an outwardly extending lip joining the top portions of the insulated walls;
   (b) a top member, wherein the top member comprises a cover plate sealed to the outwardly extending lip of the trough and a well extending into the trough, wherein the well comprises:
      (i) a sidewall having a top portion and a bottom portion, wherein the top portion of the sidewall is joined to the cover plate, wherein the sidewall of the well and the plurality of insulated walls of the trough together define a gap between the sidewall of the well and the plurality of insulated walls of the trough, and
      (ii) a floor joined to the bottom portion of the sidewall of the well, wherein the floor of the well and the floor of the trough together define a gap between the floor of the well and the floor of the trough;
   (c) a heating element pipe contained within the trough, wherein the heating element pipe is located in the gap defined between the floor of the well and the floor of the trough;
   (d) a heated fluid contained within the heating element pipe;
   (e) a stock pot inserted in the well, wherein the stock pot comprises:
      (i) a sidewall having a top portion and a bottom portion, wherein the sidewall of the stock pot and the sidewall of the well together define a gap between the sidewall of the stock pot and the sidewall of the well,
      (ii) a floor joined to the bottom portion of the sidewall of the stock pot, wherein the floor of the stock pot and the floor of the well together define a gap between the floor of the stock pot and the floor of the well, and
      (iii) an annular lip, wherein the annular lip extends outwardly from the top portion of the sidewall of the stock pot, wherein the annular lip is engaged with the cover plate, wherein the stock pot;
   (f) thermal oil positioned between the trough and the well, wherein the thermal oil is contained in the gap between the sidewall of the well and the plurality of insulated walls of the trough, wherein the thermal oil is further contained in the gap between the floor of the well and the floor of the trough, such that at least a portion of the well is immersed in the thermal oil, wherein at least a portion of the heating element pipe extends through the thermal oil such that the portion of the heating element pipe extending through the thermal oil is immersed in the thermal oil such that the thermal oil directly contacts the heating element pipe, wherein the heated fluid is configured to be communicated through the heating element pipe to heat the thermal oil; and
   (g) a cooking medium positioned between the stock pot and the well, wherein the cooking medium is contained in the gap between the sidewall of the stock pot and the sidewall of the well, wherein the cooking medium is further contained in the gap between the floor of the stock pot and the floor of the well, such that at least a portion of the stock pot is immersed in the cooking medium, wherein the cooking medium comprises water.

2. The device of claim 1, wherein the trough further comprises an insulation board.

3. The device of claim 1, wherein each insulated wall of the trough further comprises a respective first wall and a respective second wall.

4. The device of claim 3, wherein each insulated wall of the trough further comprises an insulation board positioned between the corresponding respective first wall and second wall.

5. The device of claim 1, further comprising a gasket positioned between the lip of the trough and the cover plate of the top member.

6. The device of claim 5, wherein the gasket comprises a buna material.

7. The device of claim 1, wherein the heating element pipe comprises a steam pipe.

8. A cooking device, comprising:
   (a) a trough, wherein the trough comprises:
      (i) a plurality of sidewalls,
      (ii) a floor joining at least a first portion of the plurality of sidewalls,
      (iii) a lip, wherein the lip and at least a second portion of the plurality of sidewalls define a top opening of the trough, wherein the lip extends transversely outwardly from the sidewalls,
      (iv) a heating element positioned adjacent the floor, wherein the heating element comprises a pipe, and
      (v) a first cooking medium, wherein the pipe of the heating element is immersed in the first cooking medium such that the first cooking medium directly contacts the pipe of the heating element and such that the first cooking medium is in thermal communication with the heating element, wherein the first cooking medium has a boiling point that is higher than the boiling point of water;
   (b) a cover plate, wherein the cover plate is configured to fit on the lip of the trough, wherein the cover plate is configured to cover the top opening of the trough;
   (c) a well extending downwardly from the cover plate and into the trough, wherein wherein the well comprises:
      (i) a sidewall having a top portion and a bottom portion, wherein the top portion of the sidewall is joined to the cover plate, wherein the sidewall of the well and the plurality of sidewalls of the trough together define a gap between the sidewall of the well and the plurality of sidewalls of the trough, wherein the first cooking medium is contained in the gap between the sidewall of the well and the plurality of sidewalls of the trough, and
      (ii) a floor joined to the bottom portion of the sidewall of the well, wherein the floor of the well and the floor of the trough together define a gap between the floor of the well and the floor of the trough, wherein the first cooking medium is further contained in the gap between the floor of the well and the floor of the trough, such that at least a portion of the well is immersed in the first cooking medium;
   (d) a gasket positioned between the cover plate and the lip to form a seal between the trough and the cover plate;
   (e) a heated fluid contained within the pipe of the heating element, wherein the heated fluid is configured to be communicated through the heating element pipe to heat the first cooking medium that is contained between the trough and the well;
   (f) a stock pot inserted in the well, wherein the stock pot comprises:
      (i) a sidewall having a top portion and a bottom portion, wherein the sidewall of the stock pot and the sidewall of the well together define a gap between the sidewall of the stock pot and the sidewall of the well,
      (ii) a floor joined to the bottom portion of the sidewall of the stock pot, wherein the floor of the stock pot and the floor of the well together define a gap between the floor of the stock pot and the floor of the well, and
      (iii) an annular lip, wherein the annular lip extends outwardly from the top portion of the sidewall of the stock pot, wherein the annular lip is engaged with the cover plate, wherein the stock pot; and
   (g) a second cooking medium, wherein the second cooking medium is positioned between the stock pot and the well, wherein the cooking medium is contained in the gap between the sidewall of the stock pot and the sidewall of the well, wherein the cooking medium is further contained in the gap between the floor of the stock pot and the floor of the well, such that at least a portion of the stock pot is immersed in the second cooking medium, wherein the second cooking medium comprises water.

9. The cooking device of claim 8, wherein the trough has a plurality of sides, wherein each of the sides has a pair of sidewalls of the plurality of sidewalls.

10. The cooking device of claim 9, wherein the trough further comprises insulation positioned between each of the pairs of sidewalls.

11. The cooking device of claim 8, wherein the pipe of the heating element comprises a steam pipe.

12. The cooking device of claim 8, wherein the first cooking medium comprises a thermal oil.

13. The cooking device of claim 8, wherein the well is integral with the cover plate.

14. A method of cooking a food product, the method comprising:
   (a) providing a cooking device, wherein the cooking device comprises:
      (i) a trough, wherein the trough comprises:
         (A) a plurality of sidewalls,
         (B) a floor joined to the plurality of sidewalls of the trough, and
         (C) a heating element, wherein the heating element comprises a pipe,
      (ii) a cover plate sealed to the trough, wherein the cover plate comprises a port, wherein the trough and the cover plate together define an enclosed space, and
      (iii) a well extending through the cover plate into the trough, wherein the well comprises:
         (A) a sidewall, wherein the sidewall of the well and the sidewalls of the trough together define a gap between the sidewall of the well and the sidewalls of the trough, and
         (B) a floor joined to the sidewall of the well, wherein the floor of the well and the floor of the trough together define a gap between the floor of the well and the floor of the trough;
   (b) introducing a first cooking medium into the enclosed space via the port, wherein the first cooking medium is configured to transfer heat from the heating element to the well, wherein the act of introducing a first cooking medium into the enclosed space via the port comprises immersing the pipe of the heating element in the first cooking medium such that the first cooking medium directly contacts the pipe of the heating element, wherein the introduced first cooking medium occupies at least part of the gap between the sidewall of the well and the sidewalls of the trough, wherein the introduced first cooking medium further occupies at least part of the gap between the floor of the well and the floor of the trough, such that at least part of the well is immersed in the introduced first cooking medium;

(c) introducing a second cooking medium into the well, wherein the second cooking medium is contained within the sidewall of the well and the floor of the well, wherein the second cooking medium comprises water;

(d) inserting a stock pot into the well, wherein the inserted stock pot is placed in contact with the second cooking medium, such that the second cooking medium is located between the stock pot and the sidewall and floor of the well and such that at least part of the inserted stock pot is immersed in the second cooking medium;

(e) heating the first cooking medium with the heating element, wherein the act of heating the first cooking medium with the heating element comprises communicating a heated fluid through the pipe of the heating element while the pipe is immersed in the first cooking medium, wherein the well and the second cooking medium are configured to transfer heat from the heated first cooking medium to the stock pot; and (d) introducing a food product into the stock pot to heat the food product, such that heat is transferred from the heating element to the first cooking medium to the well to the second cooking medium to the stock pot to the food product.

15. The method of claim 14, wherein the first cooking medium comprises oil.

16. The device of claim 1, wherein the heated fluid contained within the heating element pipe comprises steam or thermal oil.

17. The device of claim 1, further comprising goetta located in the stock pot.

18. The cooking device of claim 8, further comprising goetta located in the stock pot.

19. The method of claim 14, wherein the food product comprises goetta, wherein the act of introducing a food product into the stock pot comprises introducing goetta into the stock pot.

* * * * *

UNITED STATES PATENT AND TRADEMARK OFFICE
CERTIFICATE OF CORRECTION

PATENT NO. : 7,726,234 B2  Page 1 of 1
APPLICATION NO. : 11/181328
DATED : June 1, 2010
INVENTOR(S) : Daniel William Glier It is certified that error appears in the above-identified patent and that said Letters Patent is hereby corrected as shown below:

Column 6, Claim 1, line 43, reads "...cover plate, wherein the stock pot;..." and it should change to "...cover plate;..."

Column 8, Claim 8, line 10, reads "...cover plate, wherein the stock pot; and..." and it should change to "...cover plate; and..."

Column 8, Claim 8, line 13, reads "...well, wherein the cooking medium is contained in the..." and it should change to "...well, wherein the second cooking medium is contained in the..."

Column 8, Claim 8, line 15, reads "...wall of the well, wherein the cooking medium is further..." and it should change to "...wall of the well, wherein the second cooking medium is further..."

Signed and Sealed this

Thirteenth Day of July, 2010

David J. Kappos
*Director of the United States Patent and Trademark Office*